United States Patent [19]

Bauer

[11] 3,855,161
[45] Dec. 17, 1974

[54] METHOD OF NEUTRALIZING A CATALYZED ALDEHYDE CONDENSATION RESIN FOAM

[75] Inventor: William H. Bauer, Medway, Mass.

[73] Assignee: Filfast Corporation, Holliston, Mass.

[22] Filed: June 14, 1973

[21] Appl. No.: 369,809

[52] U.S. Cl..... 260/2.5 F, 117/138.8 G, 260/2.5 E, 260/29.4 R, 260/70 R
[51] Int. Cl............................................ C08g 53/08
[58] Field of Search................................. 260/2.5 F

[56] References Cited
UNITED STATES PATENTS

| | | | |
|---|---|---|---|
| 3,138,563 | 6/1964 | Morgan et al. | 260/2.5 F |
| 3,189,479 | 6/1965 | Coppick et al. | 260/2.5 F |
| 3,284,379 | 11/1966 | Brasco et al. | 260/2.5 F |
| 3,290,260 | 12/1966 | Buccigross | 260/2.5 F |
| 3,535,273 | 10/1970 | Bauer | 260/2.5 F |

Primary Examiner—Morton Foelak
Attorney, Agent, or Firm—Wolf, Greenfield & Sacks

[57] ABSTRACT

An improved method of treating a self-supporting mass of an acid catalyzed aldehyde condensation resin foam shortly after formation to substantially neutralize the foam and remove unwanted by-products of the formation reaction from the foam mass. A liquid carrying a treating material is used to penetrate the foam mass, raise the pH of the foam mass and wash away reactants and by-products of the foaming reaction. The method of this invention is particularly advantageous for use in treating ureaformaldehyde foam resin masses for ultimate use in the floral field as flower bases where it is desirable to wash cell walls of the mass to remove deposits of substances which form during manufacture and which are harmful to fresh cut flowers.

8 Claims, 1 Drawing Figure

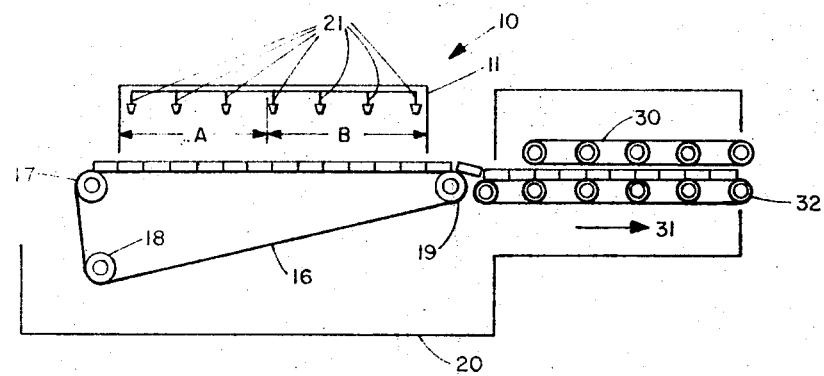

METHOD OF NEUTRALIZING A CATALYZED ALDEHYDE CONDENSATION RESIN FOAM

BACKGROUND OF THE INVENTION

The use of acid catalyzed aldehyde condensation foam resins such as urea-formaldehyde foam as bases for supporting fresh cut flowers in floral displays is well-known. Such bases prevent wilting and keep the flowers fresh for long periods of time. It is important in such bases that sufficient water be available for absorption by the flowers through their stems to keep the flowers fresh. Urea-formaldehyde foam is particularly useful for this purpose in view of its relatively low cost and frangible nature which permits ease of insertion of a flower stem into a cellular foam mass in a number of different original arrangements as desired.

In prior production of urea-formaldehyde foam resins for floral purposes, it was often considered necessary to neutralize the foam shortly after the foam reached its self-supporting structure, by the use of hydroxide immersion baths and/or gaseous ammonia neutralization as for example described in U.S. Pat. No. 3,284,379 issued NOv. 8, 1966. Such neutralization is used in some cases to prevent self-disintegration of the foam on drying and/or to reduce the acidity of the foam. Since acid catalysts are used and unreacted acid and acidic reaction products remain, the foam often has a pH of from 1.5 to 3 which is destructive to fresh cut flowers. The neutralization process is used to elevate the pH to a range of from 6 to 8 and preferably about 7 which enables fresh cut flowers to live longer when inserted into the foam.

The use of liquid hydroxide immersion baths in neutralization of urea-formaldehyde foam is sometimes difficult since it is difficult to provide means for passing the hydroxides into the foam mass in order to obtain neutralization. Gaseous ammonia while an excellent neutralizing substance for urea-formaldehyde foams, has handling difficulties. In some cases, ammonia removing scrubbers and the like must be used to reduce noxious odors resulting from gaseous ammonia neutralization.

Moreover, conventional gas neutralization often leaves unwanted by-products in the cell walls which are difficult to remove. U.S. Pat. No. 3,535,273 issued Oct. 20, 1970 discusses removal of such by-products by water which also acts to open cell walls under certain conditions of use.

SUMMARY OF THE INVENTION

It is an object of this invention to provide a method of neutralizing or increasing the pH of a self-supporting mass of acid catalyzed aldehyde condensation resin foam, rapidly and efficiently.

Still another object of this invention is to provide a method in accordance with the preceding object which can be rapidly and efficiently carried out.

Still another object of this invention is to provide a method in accordance with the preceding objects which results in self-supporting aldehyde condensation resin foam highly suitable for acting as flower bases to maintain fresh cut flowers for long periods of time.

According to the invention, a self-supporting mass of an acid catalyzed urea-formaldehyde foam is treated to increase the pH of the foam and remove unwanted materials therefrom. The foam mass is formed in accordance with conventional procedures using an excess of acid catalyst. The foam mass is then allowed to react to a self-supporting state with a pH of from about pH 1 to about pH 3 after which a surface of the foam mass is subjected to a thorough wash and flushing with a heated aqueous liquid containing a treating material under conditions which permit the liquid carrying the treating material to enter the cells of the mass and wash the mass to bring it to a pH of from about 6 to about pH 8.

Preferably the treating material is a combination of a wetting agent, a minor amount of a base and an organic defoaming agent. However, the treating material can be a soap alone, a wetting agent alone or either or a combination of both with a base and/or an organic defoamer.

BRIEF DESCRIPTION OF THE DRAWINGS

The above and other object, features and advantages of the present invention will be better understood from a reading of the following specification when read in conjunction with the accompanying drawing in which the FIGURE is a semidiagrammatic showing of an apparatus useful in carrying out the method of this invention.

DESCRIPTION OF PREFERRED EMBODIMENTS

Urea-formaldehyde foam can be prepared according to any of the known procedures before treatment in accordance with this invention. For example, as described in U.S. Pat. Nos. 3,284,379 issued Nov. 8, 1966 and 3,535,273 issued Oct. 20, 1970 which are incorporated by reference herein, a continuous system for the production of urea-formaldehyde foam can be used. In this known system, urea-formaldehyde resin, water and a foaming or wetting agent are added to a tank and thoroughly mixed by a conventional mixer. Air is incoporated into the resin mixture and the air-resin mixture passed through an extender for thoroughly mixing the liquid resin with air to form a foam. A specific extender can comprise an elongated cylindrical housing having a series of perforated discs maintained in spaced longitudinal alignment by oval spacers. The discs have varying numbers of openings or passageways for providing a tortuous passage for the resin mixture and air to assure foam formation due to turbulence.

After formation of the foam, an acid catalyst is introduced into the foam mixture to form a reaction mixture which is thoroughly mixed in a blender to blend the catalyst with the resin foam. The resin mixture is extruded through an extrusion orifice using fluid prssure supplied through a single continuous system from the resin-water-wetting agent tank and the air pressure of the air introduced.

Upon extrusion of the reaction mixture, the acid catalyzed reaction continues and ultimately cures the resin into a cellular foam mass to form a water-saturated, self-supporting, frangible structure having a density when dried of from 0.1 to 12 lbs/cu/ft depending upon the amount of air, resin and other conditions used. Normally, excess amounts of acid are used to assure rapid curing and set up of the foam.

In known procedures, the extruded foam having a large quantity of water therein and often from about 40 percent up to 90 percent by weight water is cut or formed into blocks and neutralized just after extrusion either by immersion in a bath of a basic liquid, such as ammonium hydroxide or by exposure to a basic gas such as ammonia. However, this neutralization step in accordance with known procedures, is eliminated and replaced with the step of this invention.

Thus, the reaction mixture is extruded onto a moving conveyor belt so that the resin cures into a cellular foam mass on the traveling belt. In accordance with this invention, the reaction mixture is allowed to react on the belt to form a self-supporting mass havig a pH of preferably from about 1 to about 3 and then a surface of the foam mass is subjected to a hot aqueous fluid containing a treating material under conditions which permit the treating material carrying liquid to enter cells of the mass and wash the mass to bring it to a pH of from about 6 to about 8. The raising of the pH can be a result of washing out and physical removal of acid and acidic by-products and/or actual chemical neutralization of the acid, or a combination of these factors.

The foam mass is preferably then washed with water and squeezed to remove excess liquid as described in U.S. Pat. No. 3,535,273.

The treating material wash step is preferably carried out within 4 to 30 minutes after extrusion. Preferably the reaction mixture is not fully cured before the treating material step. The treating material step can act to rupture cell walls and permits penetration of the foam by the treating material washing liquid.

In the preferred embodiment, an apparatus of the type diagrammatically illustrated in the Figure is used.

In the Figure, numeral 10 indicates a soap washing and squeezing apparatus. The apparatus 10 comprises a top hood 11 overlying an endless belt 16 mounted on rolls 17, 18 and 19. The endless belt is perforated to allow liquid to drop through to a collection vessel 20. A series of aligned water spraying nozzles as indicated at 21 extend transversely of the belt at spaced intervals to allow water and/or a treating material solution to be sprayed downwardly over the top surface of the foam as it passes therethrough with the liquid then being collected in the collection vessel 20. After passage under the spraying nozzles 21, a squeeze roll assembly is used to carry the foam in the form of blocks, in the direction of arrow 31 to a collection zone for packaging. Preferably the squeeze roll assembly squeezes the foam mass to at least one-half and preferably one-sixth of its normal height to remove residual liquid after the treatment of this invention.

The spraying section 21 can first spray a treating materialwater solution in section A followed by a plain water solution in section B or alternatively, only the treating material-water solution can be used.

Preferably the treating material-water solution is applied to the foam while the foam still maintains substantial heat of reaction. Thus, the foam passed to the conveyor belt 16 preferably has a temperature within the range of from 100°F to 140°F. The treating material-water mixture is sprayed onto the foam mass at a temperature in the range of from 120°F to 212°F but always below the decomposition temperature of the foam and acts to remove and/or chemically neutralize excess acid thus raising pH, remove unwanted impurities and in some cases to break cell walls of the foam.

The treating material carried by the liquid in the treating step of this invention can be any product or combination of products which permits rapid penetration of the foam mass to wash away and remove and/or neutralize acidic components of the foam. The liquid is preferably water although other liquids non harmful to the foam can be used.

The treating material is preferably a wetting agent which acts to break down resistance to passage through the foam of the treating material water solution. Anionic wetting agents are used when the extruded foam has cationic wetting agents used as foaming agents incorporated in the reaction mixture. Such anionic wetting agents include sodium dioctyl sulfosuccinate, sodium dihexyl sulfosuccinate, sodium diamyl sulfosuccinate and other alkali metal organo sulfosuccinates. When the foam reaction mixture has anionic wetting or foaming agents incorporated therein, the wetting agent of the treating material is preferably a cationic wetting agent such as a mixture of alkyl-trimethyl ammonium chloride 50 percent and isopropanol 50 percent wherein the alkyl constituent is derived from coconut oil fatty acids. The wetting agent is incorporated in the treating material water mixture sprayed on the foam in amounts of from 1/10 percent to 10 percent by weight and preferably 1/10 percent by weight of the mixture. Lower amounts do not enable rapid washing while higher amounts add substantially to the cost and can leave unwanted residue deleterious to flowers.

The treating material can also be a conventional soap such as one made from the saponification of long chain fatty acids with an alkali metal base. Saturated and unsaturated long chain fatty acids having from 8 to 18 carbon atoms are preferred in the soaps useful in this invention. Useful soaps include but are not limited to ammonium oleate, ammonium laurate, ammonium stearate, aluminum oleate, potassium oleate, potassium laurate, potassium stearate, sodium oleate, sodium stearate, sodium laurate or mixtures of these soaps. The soap is preferably incorporated in the treating material water mixture sprayed on the foam in amounts of from 0.5 to 10 percent by weight of the mixture and preferably 1 pecent by weight. Lower amounts do not enable rapid washing out of the foam while higher amounts can add to the cost, create unwanted foaming which hinders penetration of the treating material and/or can leave unwanted residue deleterious to flowers.

Preferably the treating material in addition to the wetting agent or soap or combination of the two further comprises a small amount of a basic material such as a hydroxide or carbonate which acts to chemically neutralize excess acid in the foam or other acidic products in the foam. Such basic materials include but are not limited to ammonium hydroxide, barium hydroxide, ammonium carbonate, potassium carbonate, potassium hydroxide, sodium hydroxide and sodium bicarbonate. The basic material is preferably used in amounts of from 1/10 to 10 percent by weight of the treating material water mixture sprayed on the foam and preferably 1/12 percent by weight.

Preferably the treating material water mixture used in the method of this invention further comprises a minor amount of a defoaming agent such as emulsified silicone materials. Dow Corning DB-31 antifoam emulsion, a product of Dow Corning Corp. of Midland, Mich., containing 30 percent silicone materials emulsified in an aqueous system is preferred for use in amounts of from 1/10 to 1/100 percent by weight of the treating material water mixture. Only small amounts are preferred in order to reduce costs and avoid leaving residues of material in the foam. The defoaming agent helps to prevent foaming of the treating material water mixture of this invention and further acts to break or destroy bubbles in the foam mass to further permit penetration of the treating material water mixture of this invention into the foam mass to thoroughly wash it. Preferably the defoaming agent is used in an amount of 1/100 percent by weight of the mixture.

While the treating material water combination is often referred to herein as a mixture, in most cases the treating material is in solution form. The treating material water mixture is preferably sprayed on the foam mass from one side of the mass, preferably downwardly thereon in sufficient volume to thoroughly wet and pass through the entire foam mass until such time as the foam mass is reduced in pH value to a pH in the range of from 6 to 8.

In a first specific example of producing treated urea-formaldehyde foam masses according to this invention, 150 gallons of a partially cured urea-formaldehyde resin in a ratio of 1 ½-2 formaldehyde to 1 urea with a solids content of 66 percent, is mixed with 110 gallons of water. The resin-water solution is preferably adjusted by variation in the amount of water so that the final mixture has a viscosity of approximately 19 as read on a model LVF Brookfield viscometer (Synchro-Lectric viscometer). 2 ½ gallons of a cationic wetting agent, which acts as a foaming agent, such as a mixture of alkyl-trimethyl ammonium chloride 50 percent and isopropanol 50 percent wherein the alkyl constituent is derived from coconut oil fatty acids are added to the resin-water mixture. Preferably the temperature of the mixture is maintained between 90° and 100°F although variations are possible.

After mixture of the ingredients, the mixture is passed through a fluid pump under a fluid pressure of approximately 120 lbs/sq/in. and air is admitted to the mixture through an air line under a pressure of 140 to 190 lbs/sq/in. the air-resin mixture is foamed in an extender as previously described to form a uniform foam and then passes through a second mixing tube by the fluid pressure after addition of 75 percent phosphoric acid aqueous solution. The phosphoric acid catalyst is metered into the system at a constant rate with a total of approximately 45 lbs of the 75 percent solution of phosphoric acid used. The wet catalyzed foam is extruded through a nozzle onto a conveyor belt to form a sheet having a width of 32 inches and allowed to foam to a height of approximately 3¼ inches.

The wet urea-formaldehyde foam issuing from the nozzle of the extruder has a wet density of 4.5 lbs/cu/ft and a pH of approximately 2.5. The foam, if dried, has a large number of opened interconnecting cells but, a number of these cells have only small interconnecting openings which impede the passage of water and in addition, there are a number of closed non-interconnecting cells present in the foam.

Curing of the foam sheet is allowed to proceed until a point is reached where, while still wet, the sheet is self-supporting. At this point, the sheet is cut into blocks having a length of approximately 9 inches, a depth of 3¼ inches and a width of 4 inches. The blocks are then passed onto the belt 16 in adjacent rows of 7 blocks each. At this point, approximately 12 minutes after extrusion, the wet blocks are liquid saturated with 40 to 90 percent of their weight being water and have a temperature of approximately 110°F.

A water-treating material mixture consisting of 1 percent by weight sodium dioctyl sulfosuccinate 75 percent active in a water 50 percent-alcohol 50 percent solution, 1/100 percent by weight silicone defoamer DB-31, 1/10 percent by weight NaOH and the balance water is sprayed on the top of the foam blocks, carried by conveyor belt 16, at a rate of 40 gallons per minute with the rate of foam travel being approximately 4,000 blocks per hour. The treating material water mixture is heated to a temperature in the range of from 130° to 212°F and preferably 160°F. The blocks so treated are then passed directly to the squeeze roll assembly 31 where they are resiliently squeezed and then packaged while wet. It is found that the pH of the foam so treated is elevated to a pH within the range of from 6 to 8. The treated foam is highly useful as flower bases and will absorb large amounts of water when immersed in water.

In a second example of this invention, the first example is repeated; however, the foam is subjected to an additional hot water spray at a temperature of 140°F immediately after the treating material water spray and before squeezing. Here again, foam blocks result which are eminently suitable for use as flower bases.

In a third example of this invention, the second example is repeated; however, the water-treating material mixture consists of 1 percent by weight sodium oleate in water. The so treated foam is highly useful as flower bases and will absorb large amounts of water.

In a fourth example of this invention, the second example is repeated; however, the water-treating material mixture consists of 1 percent by weight sodium oleate and 1/10 percent by weight sodium hydroxide in water. The so treated foam is highly useful as flower bases and will absorb large amounts of water.

In a fifth example of this invention, the second example is repeated; however, the water-treating material mixture consists of 1 percent by weight sodium dioctyl sulfosuccinate in water. The so treated foam is highly useful as flower bases and will absorb large amounts of water.

In a sixth example of this invention, the second example is repeated; howver, the water-treating material mixture consists of 1 percent by weight sodium oleate, 1/10 percent by weight sodium hydroxide and 1/100 percent by weight DB-31 in water. The so treated foam is highly useful as flower bases and will absorb large amounts of water.

In a seventh example of this invention, the second example is repeated; however, the water-treating material mixture consists of 1 percent by weight sodium dioctyl sulfosuccinate and 1/100 percent by weight silicone defoamer DB-31 in water. The so treated foam is highly useful as flower bases and will absorb large amounts of water.

While specific examples of the present invention have been described above, variations are possible. For example, the specific amount of treating material and water mixture used can vary greatly depending upon the time necessary to bring the pH up to the desired value. In all cases, the treating material comprises an agent which allows rapid penetration of the foam mass to permit thorough washing out and flushing of the foam mass to increase the pH of the foam mass and is non-destructive to the foam mass.

The embodiments of the invention in which an exclusive property or privilege is claimed, are defined as follows;

1. A method of treating a self-supporting mass of an acid catalyzed urea-formaldehyde foam to increase the pH of the foam and remove unwanted materials therefrom, said method comprising forming a foam mass with the use of an excess of acid catalyst, allowing said foam mass to react to a self-supporting mass having a pH of from about pH 1 to pH 3, and subjecting a surface of said foam mass to a hot aqueous liquid containing a treating material selected from the group consisting essentially of a cationic wetting agent and an anionic wetting agent, at a temperature of from about 120°F to about 212°F under conditions which permit said treating material containing liquid to enter cells of said mass and wash said mass to bring it to a pH of from about 6 to 8.

2. A method in accordance with the method of claim 1 and further comprising the step of washing the cells of the mass with water after subjecting to said treating material.

3. A method in accordance with the method of claim 2 wherein said treating material is a soap.

4. A method in accordance with the method of claim 2 wherein said treating material is a wetting agent selected from the group consisting essentially of sodium dioctyl sulfosuccinate, sodium dihexyl sulfosuccinate, sodium diamyl sulfosuccinate and a mixture of alkyl trimethyl ammonium chloride and isopropanol wherein the alkyl constituent is derived from coconut oil fatty acids.

5. A method in accordance with the method of claim 2 wherein said treating material consists essentially of a wetting agent and a defoaming agent.

6. A method in accordance with the method of claim 2 wherein said treating material consists essentially of a wetting agent, a defoaming agent and a basic compound.

7. A method in accordance with the method of claim 2 wherein said treating material consists essentially of a soap, a defoaming agent and a basic compound.

8. A method in accordance with the method of claim 2 wherein said treating material comprises sodium dioctyl sulfosuccinate in an amount of from 1/10 to 10 percent by weight, a silicone defoaming agent in an amount of from 1/10 to 1/100 percent by weight and a hydroxide in an amount of from 1/10 to 10 percent by weight.

* * * * *